(12) United States Patent
Sanderson

(10) Patent No.: US 6,176,167 B1
(45) Date of Patent: Jan. 23, 2001

(54) HELICOPTER UNDERSIDE ARMAMENT MOUNTING APPARATUS AND ASSOCIATED METHODS

(76) Inventor: Paul H. Sanderson, 2019 Cripple Creek, Lewisville, TX (US) 75077

( * ) Notice: Under 35 U.S.C. 154(b), the term of this patent shall be extended for 0 days.

(21) Appl. No.: 09/281,855

(22) Filed: Mar. 31, 1999

(51) Int. Cl.⁷ ..................................................... B64D 1/06
(52) U.S. Cl. ........................ 89/1.54; 89/1.58; 89/37.16; 244/137.4
(58) Field of Search ................................. 89/1.54, 1.58, 89/1.51, 1.59, 1.53, 37.22, 37.16; 244/137.4

(56) References Cited

U.S. PATENT DOCUMENTS

| | | | |
|---|---|---|---|
| 4,609,167 | * | 9/1986 | Dean et al. ........................ 244/137.4 |
| 5,065,961 | * | 11/1991 | Ellis et al. ............................ 89/1.54 |
| 5,187,318 | | 2/1993 | Sanderson et al. ................. 89/37.22 |
| 5,263,397 | * | 11/1993 | Sanderson .......................... 89/37.22 |
| 5,499,785 | * | 3/1996 | Roberts et al. .................... 244/137.4 |
| 5,517,895 | * | 5/1996 | Sanderson .......................... 89/37.16 |
| 5,788,186 | * | 8/1998 | White ................................ 244/137.4 |
| 5,932,829 | * | 8/1999 | Jakubowski, Jr. .................... 89/1.54 |

* cited by examiner

Primary Examiner—J. Woodrow Eldred
(74) Attorney, Agent, or Firm—Konneker & Smith, P.C.

(57) ABSTRACT

A specially designed support structure is used to mount a pair of conventional elongated bomb racks, each adapted to releasably support either a missile or a torpedo, on the underside of a helicopter on opposite sides of its longitudinal centerline, with the lengths of the bomb racks extending parallel to the centerline. The support structure includes a pair of reinforcing plates secured to vertical sides of longitudinally extending keel beams on opposite sides of the centerline. Each plate has front and rear bottom mounting lugs that extend downwardly through corresponding openings in the helicopter underside. The front and rear mounting lug pairs are respectively connected to opposite ends of front and rear cross beam members, which longitudinally extend transversely to the centerline, by adapter structures that also support opposite end portions of the bomb racks. Each adapter structure is pivotally secured to its associated mounting lug while being nonpivotally anchored to its associated cross beam to thereby prevent torsional loads from being imposed by the cross beams on the reinforcing plates about longitudinal axes. The rear cross beam is configured to provide clearance for the folded tail fins of missiles supported by the bomb racks. An alternate embodiment of the support structure supports only one bomb rack and provides underside clearance on the other side of the longitudinal centerline for a dipping sonar cable extendable downwardly from the underside of the helicopter.

27 Claims, 17 Drawing Sheets

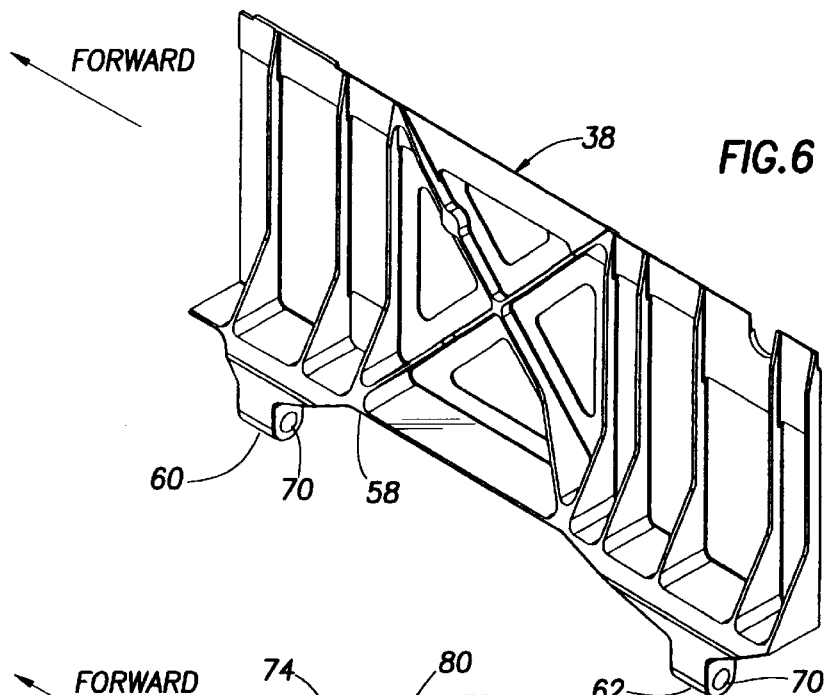
FIG.6
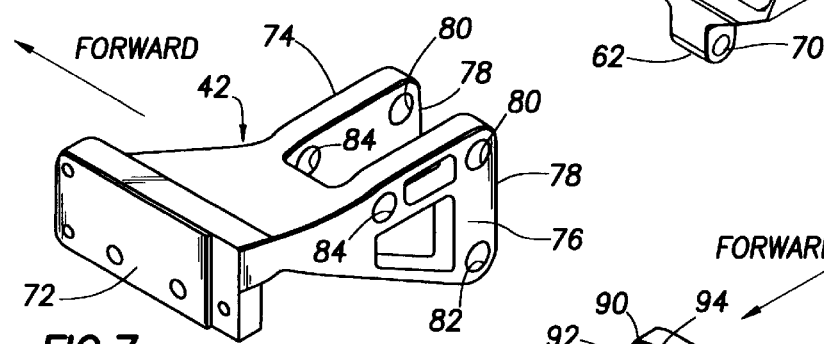
FIG.7  FIG.8
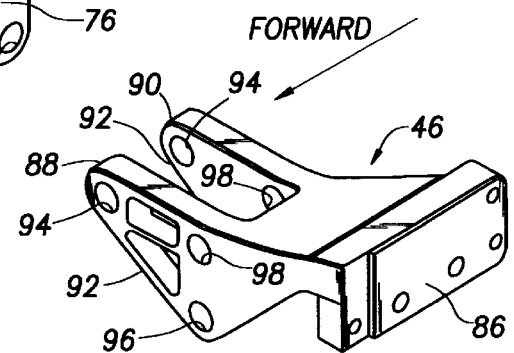
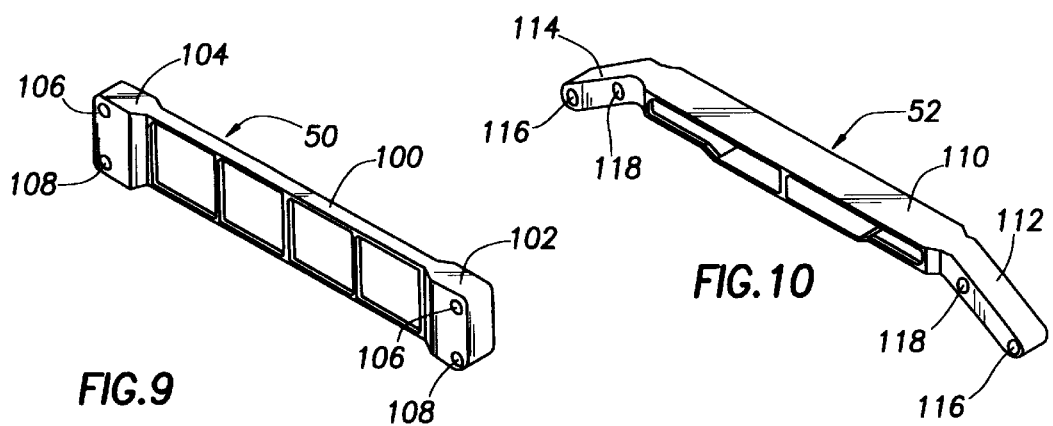
FIG.9  FIG.10

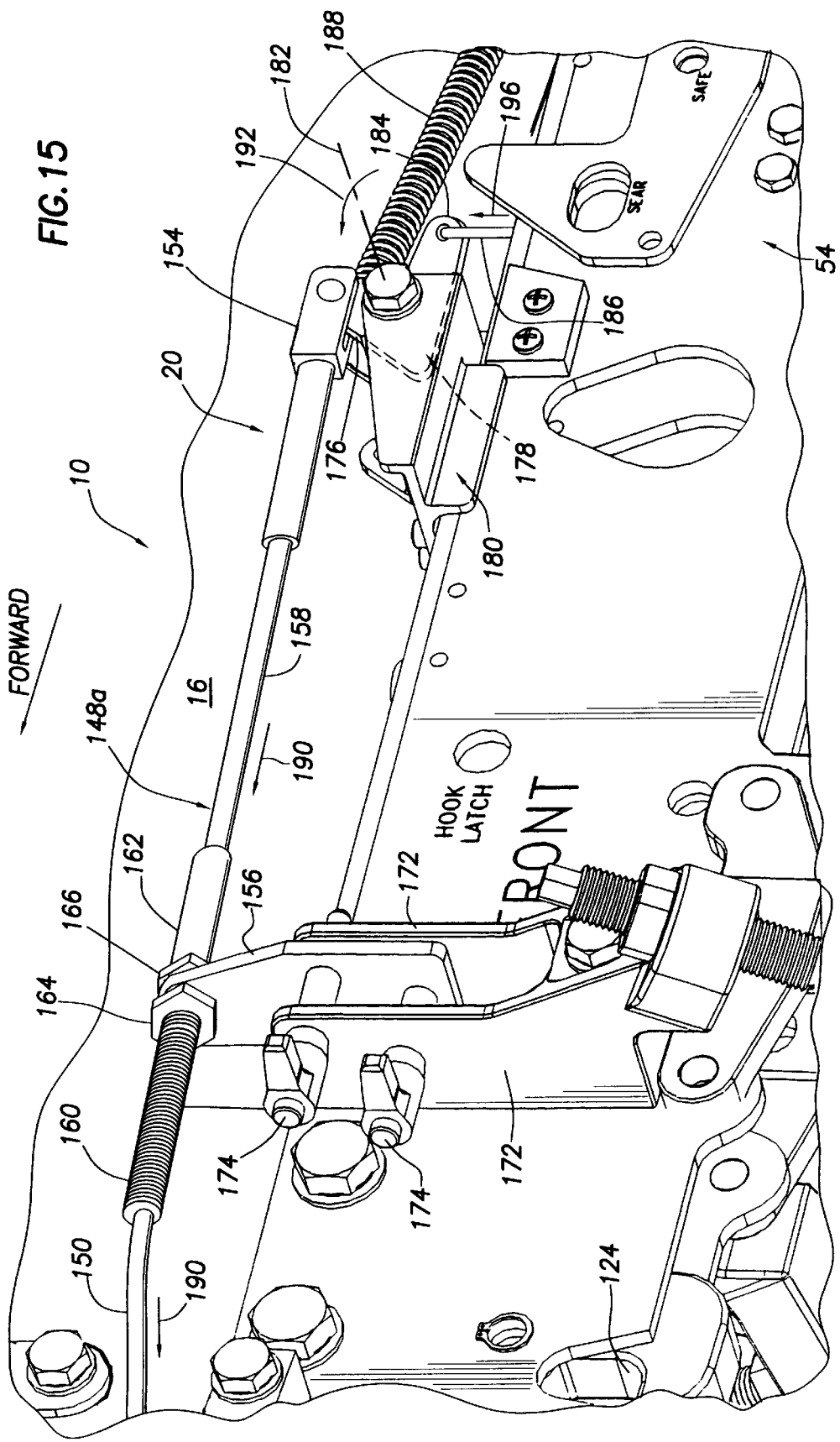

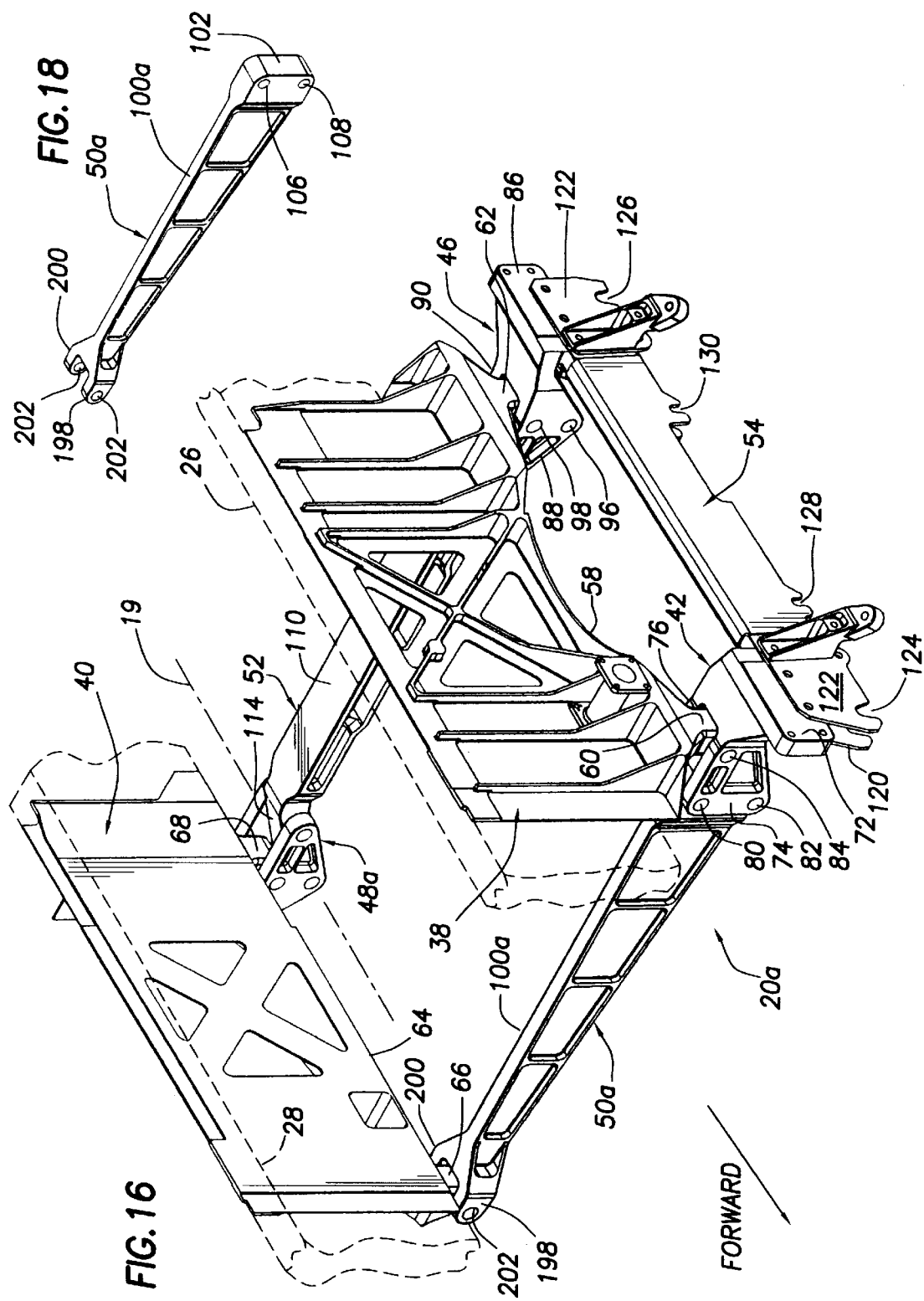

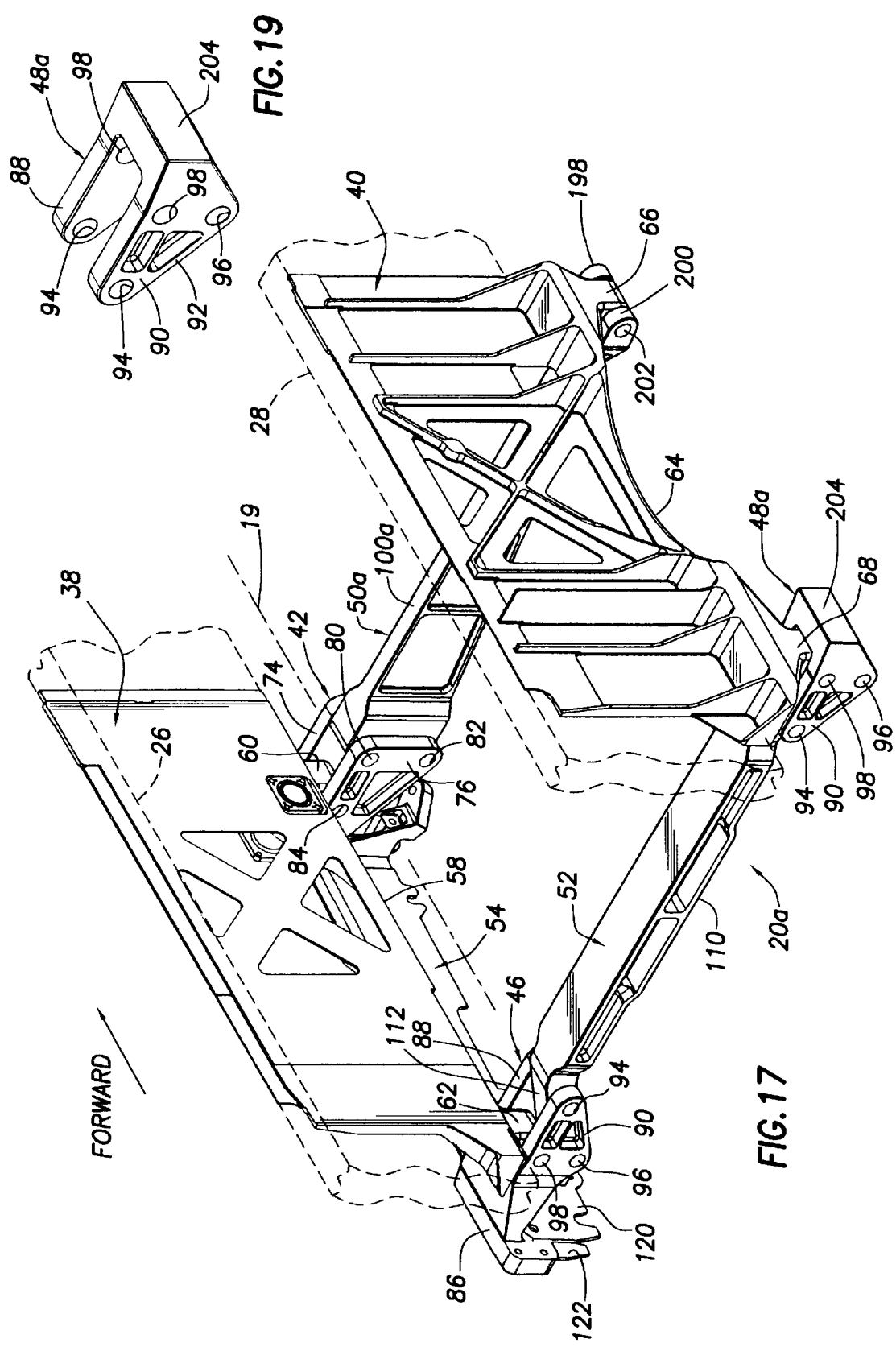

HELICOPTER UNDERSIDE ARMAMENT MOUNTING APPARATUS AND ASSOCIATED METHODS

BACKGROUND OF THE INVENTION

The present invention generally relates to aircraft armament apparatus and associated methods and, in a preferred embodiment thereof, more particularly relates to a specially designed support structure and associated methods operative to mount weaponry, such as missiles or torpedoes, on the underside of a helicopter or other type of aircraft.

As representatively illustrated in, for example, U.S. Pat. No. 5,187,318 to Sanderson et al, an advantageous method of mounting weaponry, such as machine guns and rocket launchers, on a helicopter (or other type of aircraft) incorporates an elongated support plank member that is longitudinally extended transversely through the cabin area of the helicopter, with a central portion of the plank being anchored to the cabin area floor and outer end portions of the plank projecting outwardly beyond opposite sides of the helicopter. The selected weaponry is supported on the undersides of these outwardly projecting plank end portions.

One of the factors that must be considered when mounting weaponry in positions substantially offset from the opposite sides of the helicopter in this manner is the necessity of maintaining the overall lateral center of gravity of the aircraft within acceptable design limits. For example, the mounting of a single heavy weapon on only one of the outboard plank tip locations could offset the aircraft's resulting lateral center of gravity an unacceptable distance toward such single heavy weapon.

When machine guns, such as 7.62 mm "mini" guns and .50 caliber machine guns, and multi-tube rocket launchers are mounted on the outwardly projecting plank ends, this lateral center of gravity offset problem does not arise for several reasons. For example, this type of weaponry is designed to stay on the plank during flight and may be arranged on the outer plank sections such that the overall weaponry weight load is substantially balanced from side-to-side or at least does not shift the helicopter's lateral center of gravity to an unacceptable degree. Additionally, even though these weapons are supported at substantial outboard distances from the helicopter's opposite sides, they relatively light in weight—a factor which, of course, lessens the degree to which they might undesirably shift the lateral center of gravity of the helicopter in unbalanced side-to-side plank mounted weaponry weight distributions on the helicopter.

As opposed to machine guns, plank mounted multi-tube rocket launchers pose a slightly different weight problem since as a launcher begins to launch its rockets its plank-carried weight is correspondingly diminished. Accordingly, if multi-tube rocket launchers are mounted on the opposite outer ends of a given support plank, and only one launcher is fired, a resulting side-to-side weight imbalance is imparted to the helicopter. To alleviate this potential problem, it is common practice to synchronize the firing of these rocket launchers on opposite ends of the support plank so that their overall remaining weights are substantially equalized. Even if this cannot be done for some reason, the lateral center of gravity design limits of the helicopter tend not to be exceeded due to the relatively light weights of these weapons.

For a variety of applications, it has been become desirable to mount other types of weapons on a helicopter (or other type of aircraft) which (1) are considerably heavier than the described plank-mounted machine guns and rocket launchers, and (2) are designed to be utilized by dropping them from the helicopter as opposed to remaining on the helicopter after firing. Two of these types of weapons are self-guiding missiles and torpedoes.

Because these types of weapons are considerably heavier than the typical plank-mounted machine guns and multi-tube rocket launchers, and are designed to be dropped from the helicopter as opposed to remaining thereon after use, it has proven to be quite difficult to incorporate these systems in a plank-based weaponry support system without making complex modifications to the plank structure or having to undertake difficult weight shifting procedures within the helicopter or other type of aircraft to compensate for the sudden off-centerline weight reduction when the weapon is abruptly dropped from the helicopter.

Due to these and other difficulties in adapting this type of heavier, droppable weaponry to a plank-based weaponry support system, a need exists for an alternate type of support system for this general type of weaponry. It is to this need that the present invention is directed.

SUMMARY OF THE INVENTION

In carrying out principles of the present invention, in accordance with a preferred embodiment thereof, specially designed armament apparatus is provided for use, for example by employing methods of the invention, with an aircraft, illustratively a helicopter, having a bottom exterior wall portion disposed beneath laterally spaced first and second interior structural members representatively in the form of first and second beams longitudinally extending parallel to and positioned on opposite sides of the front-to-rear lateral centerline of the aircraft. Illustratively, the beams are two keel beams of the helicopter.

In one preferred embodiment of the invention, the armament apparatus includes first and second reinforcing structures, representatively reinforcing plate structures, which are attachable in vertical orientations to side portions of the first and second beams, respectively. Each of the reinforcing plate structures has front and rear bottom mounting lug portions configured and positioned to project downwardly beyond the bottom exterior wall portion through openings formed therein prior to the operative attachment of the reinforcing plate structures to the beams.

The armament apparatus also includes front and rear cross members each having opposite end portions, and securement apparatus. The securement apparatus is operative to (1) connect the opposite end portions of the front and rear cross members, respectively, to the front and rear bottom mounting lug portions beneath the aircraft bottom exterior wall portion, and (2) supportingly secure the front and rear end portions of a first weaponry support structure, to the front and rear bottom mounting lug portions of the first reinforcing plate structure, the first weaponry support structure being operative to support a weapon thereon. Illustratively, the weaponry support structure is a first bomb rack operative to support either a missile or torpedo thereon.

This embodiment of the armament apparatus, which supports a weapon on only one side of the aircraft's front-to-rear centerline on the underside of the aircraft, provides clearance on an underside portion of the aircraft on the other side of such centerline for a conventional dipping sonar cable and associated transducer which may be lowered and raised through an opening in the aircraft's underside.

According to a feature of the invention, the securement apparatus is operative to permit pivotal movement between the securement apparatus and the front and rear bottom mounting lug portions about front-to-rear extending axes to thereby substantially prevent the imposition on the front and rear bottom mounting lug portions (and thus their associated reinforcing plate structures), via the securement apparatus, of torsional loads about these front-to-rear extending axes.

In a preferred embodiment thereof, the securement apparatus includes first and second adapter structures having first portions pivotally securable to the front and rear bottom mounting lug portions of the first reinforcing plate structure. The first and second adapter structures further have second portions releasably connectable to the front and rear end portions of the first weaponry support structure, and third portions nonpivotally anchorable to the opposite end portions of the front and rear cross members respectively positionable adjacent the front and rear bottom mounting lug portions of the first reinforcing plate member.

Illustratively, these third portions of the first and second adapter structures have clevis sections adapted to straddle the front and rear bottom mounting lug portions of the first reinforcing plate structure and the opposite end portions of the front and rear cross members respectively positionable adjacent the front and rear bottom mounting lug portions of the first reinforcing plate structure. Representatively, each of the front and rear bottom mounting lug portions of the first reinforcing plate structure preferably has a first mounting member receiving hole therein, each of the opposite end portions of the front and rear cross members respectively positionable adjacent the front and rear bottom mounting lug portions of the first reinforcing plate member has a spaced pair of second and third mounting member receiving holes therein, and opposite sides of the clevis sections of the third portions of the first and second adapter structures have first mounting member receiving openings formed therein and outwardly alignable with the first mounting member receiving holes, and second and third mounting member receiving openings formed therein and outwardly alignable with the second and third mounting member receiving holes.

The previously mentioned first bomb rack is illustratively operative to releasably support a missile having folded upper tail fins, and the rear cross member is positioned and configured to provide clearance for the folded upper tail fins of the releasably supported missile. To provide the rear cross member with this tail fin clearance capability it is preferably provided with a generally straight longitudinally intermediate portion positionable above the folded upper tail fins of the releasably supported missile, with the opposite end portions of the rear cross member being downwardly and longitudinally outwardly sloped relative to the longitudinally intermediate portion of the rear cross member.

In a second preferred embodiment of the armament apparatus, the armament apparatus further includes a second weaponry support structure, representatively a second bomb rack adapted to releasably support either a missile or a torpedo and having front and rear end portions, and the securement apparatus is further operative to supportingly secure the front and rear end portions of the second weaponry support structure to the front and rear bottom mounting lug portions of the second reinforcing plate structure. To this end, the securement apparatus preferably further includes third and fourth adapter structures similar to the first and second adapter structures and utilized to secure ends of the front and rear cross members to the front and rear bottom mounting lug structures of the second reinforcing plate structure, and to secure front and rear end portions of the second weaponry support structure to these mounting lug structures.

The armament apparatus and associated methods of the present invention, by mounting relatively heavy weaponry such as missiles and torpedoes on the underside of a helicopter or other aircraft, and transferring the weight of such weaponry to the structural framework of the helicopter, substantially reduces the lateral center of gravity shifting problems associated with the support plank mounting of such weaponry.

BRIEF DESCRIPTION OF THE DRAWINGS

FIG. 6 is a reduced scale rear perspective view of a left doubler plate portion of the armament mounting apparatus;

FIG. 7 is a rear perspective view of a front adapter block portion of the armament mounting apparatus;

FIG. 8 is a front perspective view of a rear adapter block portion of the armament mounting apparatus;

FIG. 9 is a reduced scale perspective view of a front cross beam portion of the armament mounting apparatus;

FIG. 10 is a reduced scale perspective view of a rear cross beam portion of the armament mounting apparatus;

FIGS. 11–15 are front underside perspective views of the helicopter and sequentially illustrate the installation of portions of the armament apparatus thereon;

FIG. 16 is a front perspective view of an alternate embodiment of the armament mounting apparatus;

FIG. 17 is a rear perspective view of the alternate armament mounting apparatus embodiment;

FIG. 18 is a reduced scale front side perspective view of a front cross beam member used in the alternate armament mounting apparatus embodiment;

FIG. 19 is a reduced scale rear side perspective view of a rear adapter block member used in the alternate armament mounting apparatus embodiment.

DETAILED DESCRIPTION

Figure 1:
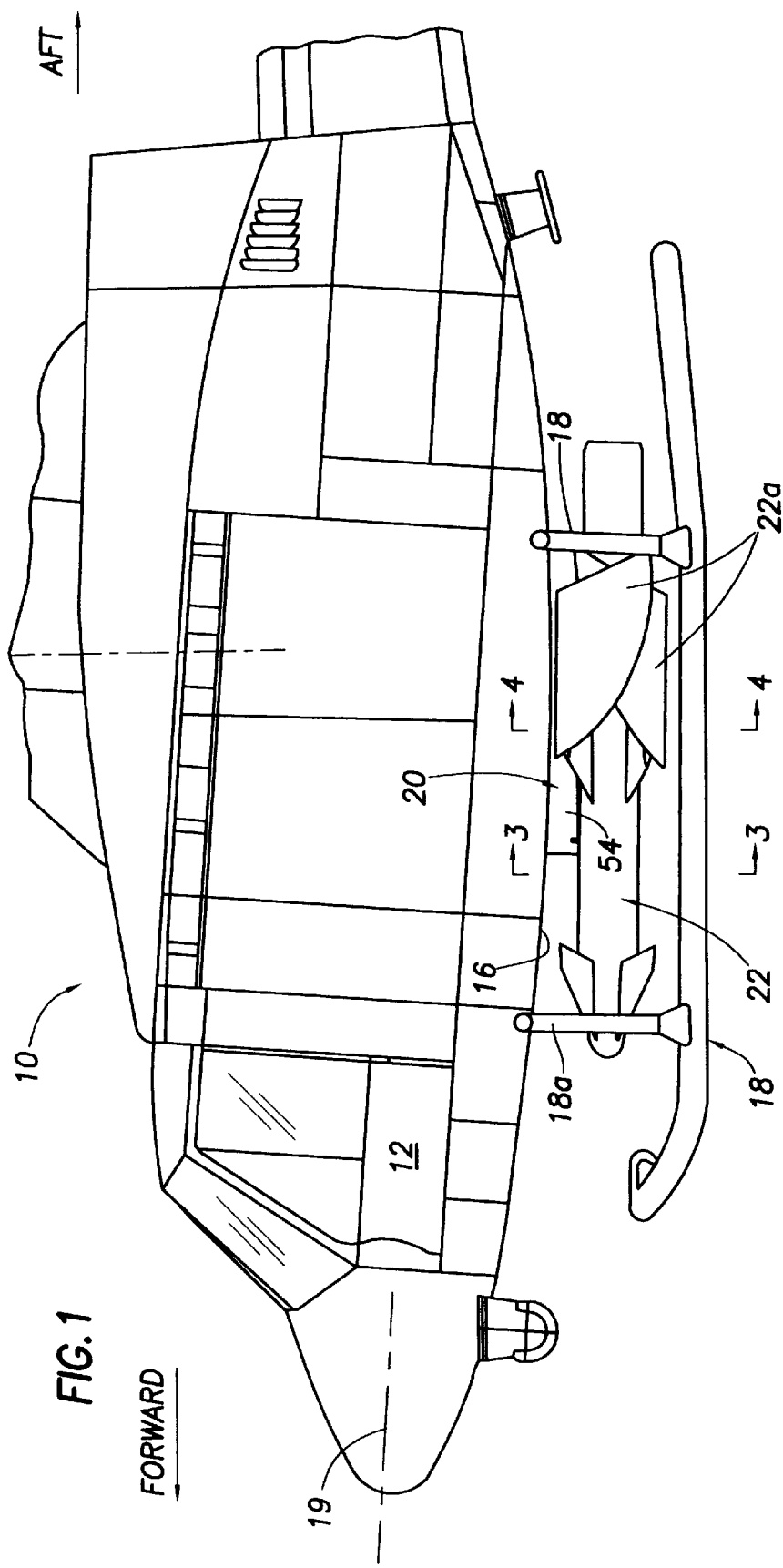
FIG. 1 is a partial left side elevational view of a representative helicopter having incorporated thereon underside armament mounting apparatus embodying principles of the present invention.
Figure 2:
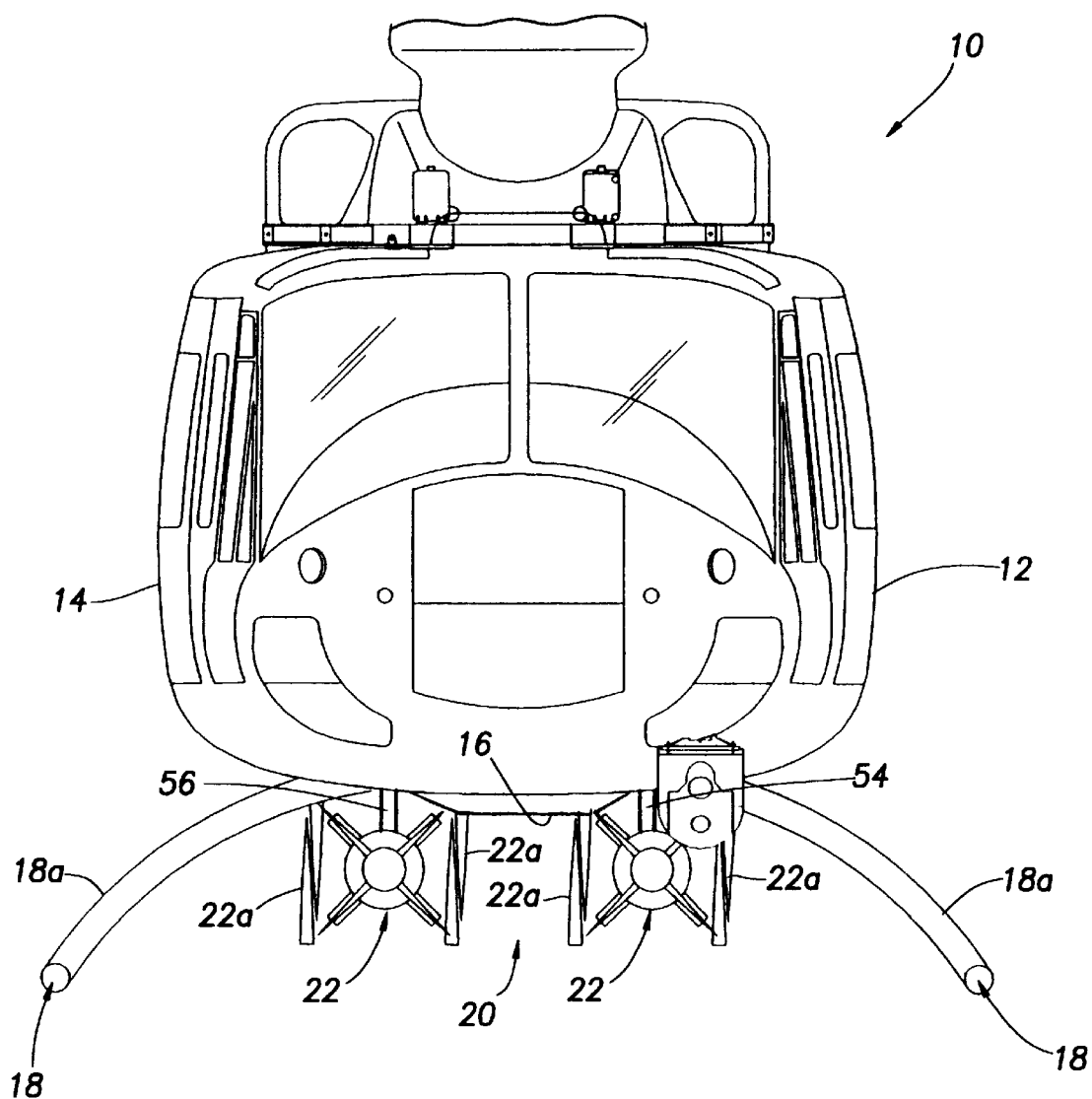
FIG. 2 is a partial front end elevational view of the helicopter.

Illustrated in FIGS. 1 and 2 are portions of a representative helicopter 10 having opposite left and right sides 12 and 14, an underside portion having a bottom side wall 16 from which the usual landing skid structures 18 downwardly project, and a longitudinal centerline 19. As will be subsequently described herein in greater detail, the present invention provides specially designed armament apparatus 20 which permits weapons, such as the depicted pair of self-guided missiles 22, to be releasably mounted on the underside of the helicopter 10, inboard of its opposite left and right sides 12,14 and skid structures 18 and on opposite sides of its longitudinal centerline 19. Other types of weapons, such as torpedoes, may be alternatively supported on the underside of the helicopter using the armament apparatus 10, and the armament apparatus 10 may be incorporated in other types of aircraft, such as fixed wing aircraft, if desired.

Figure 3:
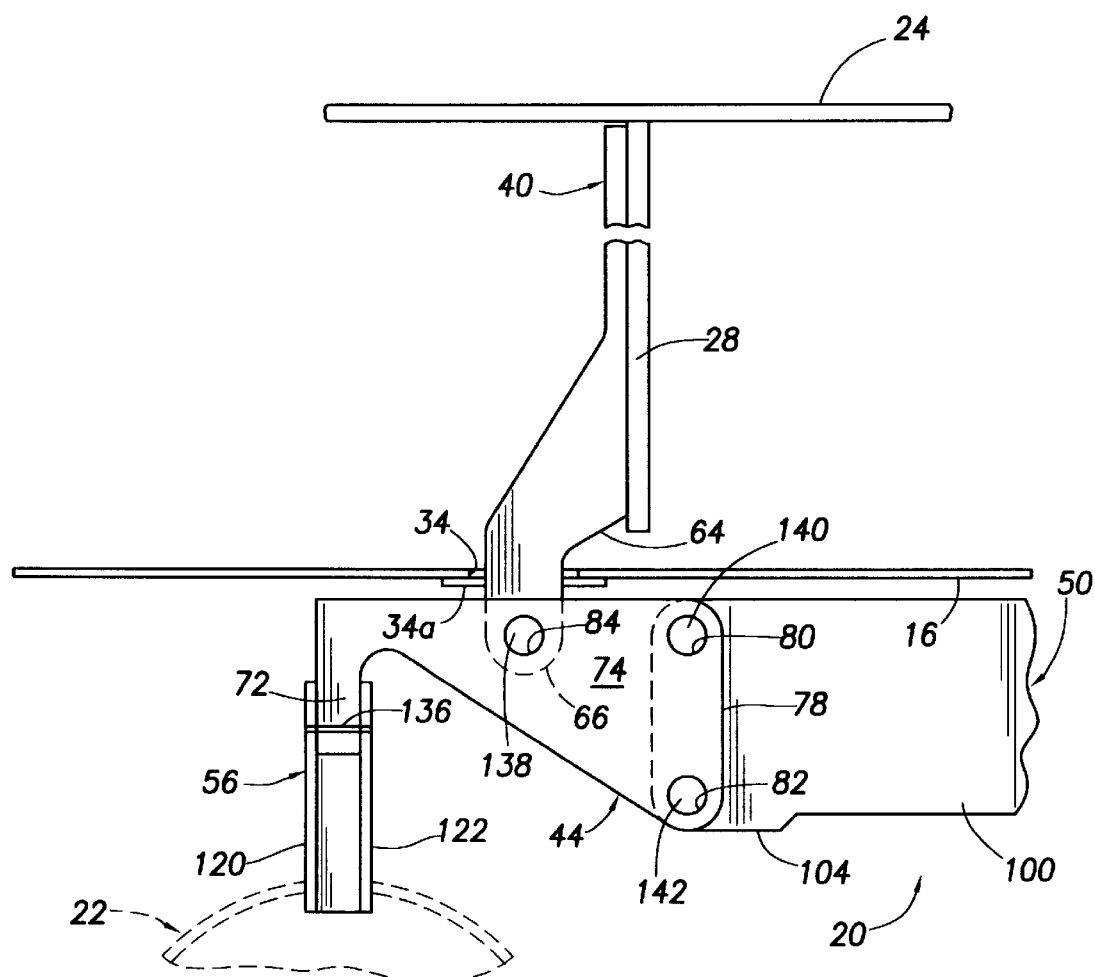
FIG. 3 is an enlarged scale simplified partial cross-sectional view through a right side portion of the helicopter taken generally along line 3—3 of FIG. 1.
Figure 4:
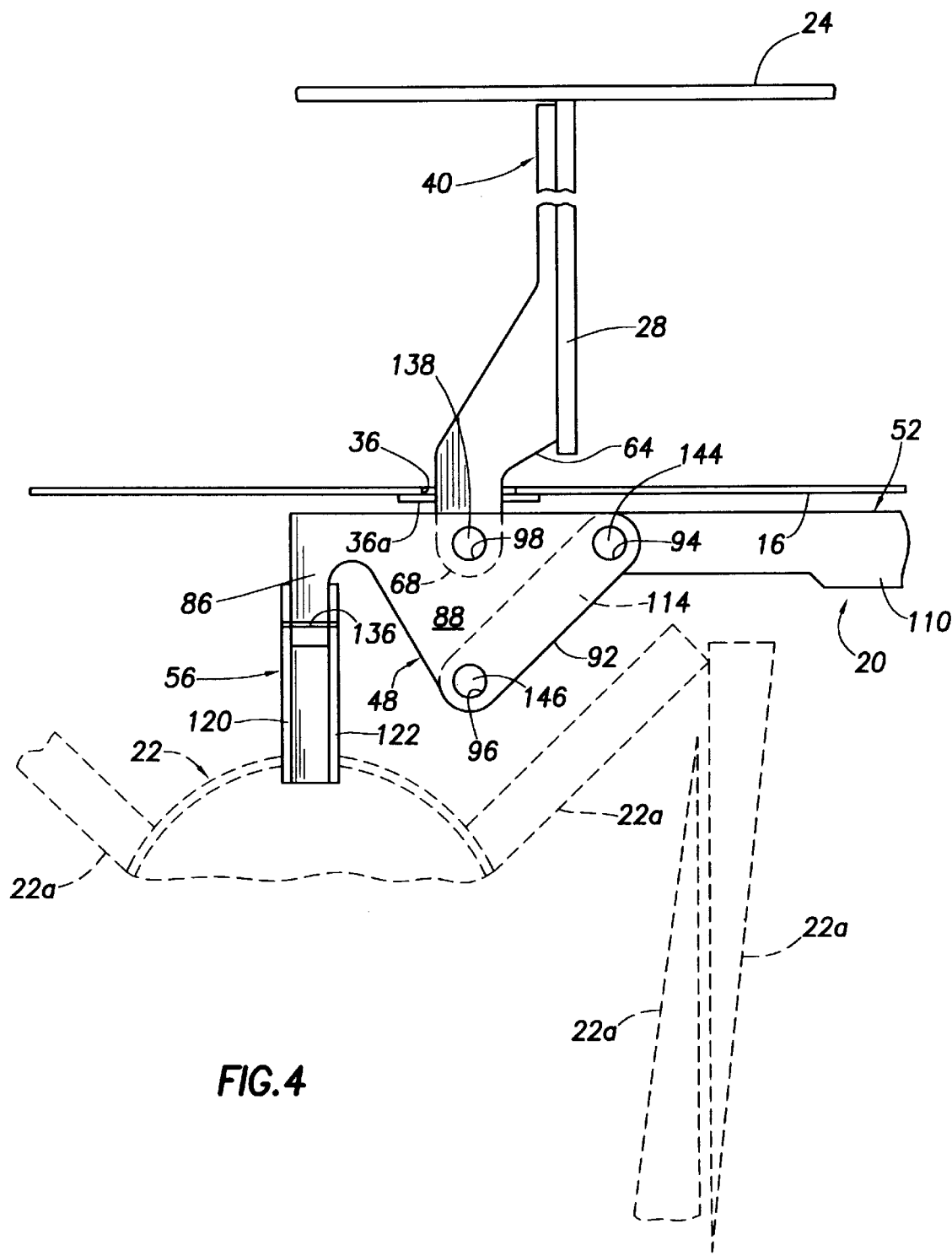
FIG. 4 is an enlarged scale simplified partial cross-sectional view through a right side portion of the helicopter taken generally along line 4—4 of FIG. 1.
Figure 5:
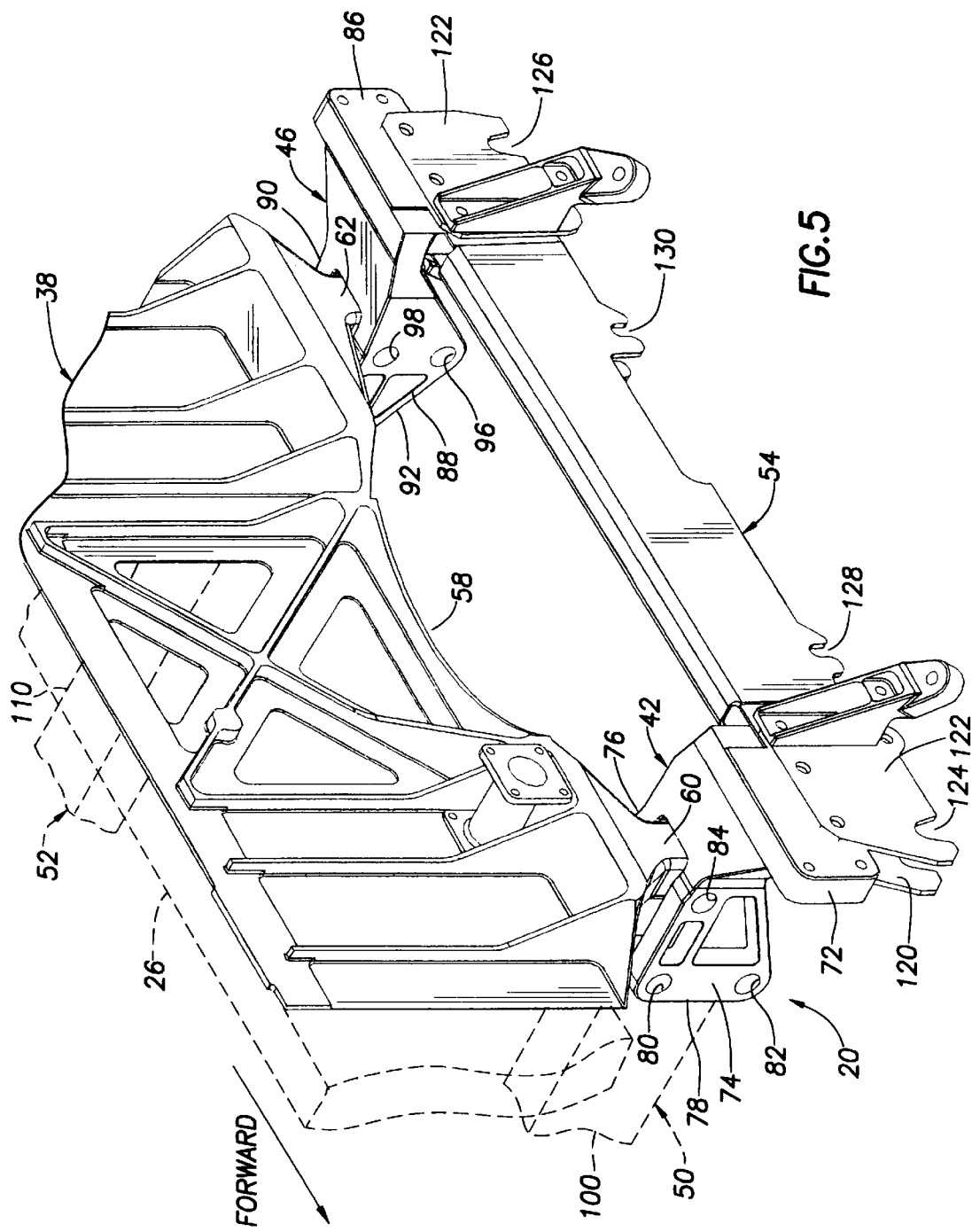
FIG. 5 is an enlarged scale, partially phantomed front perspective view of a left portion of the armament mounting apparatus.

Helicopter 10 has a floor 24 (see FIGS. 3 and 4) which is spaced upwardly apart from the bottom side wall 16. Various interior support structures are disposed between the bottom side wall 16 and the floor 24, including laterally spaced apart left and right keel beams 26 and 28 (see FIGS. 3–5 and 16) that longitudinally extend parallel to the helicopter centerline 19 on opposite sides thereof. As will be seen, the armament apparatus 20 is structurally tied to these keel beams 26 and 28 so that the armament apparatus weight is efficiently borne by the beams.

To prepare the helicopter 10 for the installation of the underside armament apparatus 20, small longitudinally spaced front and rear openings 30,32 (see FIG. 11) are formed in the bottom helicopter side wall 16 below the left keel beam 26 and laterally outwardly offset a small distance therefrom, with the openings 30,32 being longitudinally positioned between the vertical front and rear skid structure portions 18a,18b (see FIG. 1). The peripheries of the openings 30,32 are preferably reinforced with metal trim strip structures 30a,32a. Additionally, small longitudinally spaced front and rear openings 34,36 (see FIGS. 3, 4, 12 and 13) are formed in the bottom helicopter side wall 16 below the right keel beam 28 and laterally outwardly offset a small distance therefrom, with the openings 34 and 36, respectively, being longitudinally aligned with the openings 30 and 32. The peripheries of the openings 34,36 are preferably reinforced with metal trim strip structures 34a, 36a.

Turning now to FIGS. 3–10 and 16, the armament apparatus 20 includes (1) left and right skin doubler or reinforcing plate structures 38 and 40; (2) left and right front adapter blocks 42 and 44; (3) left and right rear adapter blocks 46 and 48; (4) front and rear cross beam members 50 and 52; and (5) left and right bomb racks 54 and 56.

The left reinforcing plate 38 (see FIGS. 5 and 16) has a lower side edge 58 from which spaced apart, laterally offset front and rear bottom mounting lugs 60,62 downwardly project. Similarly, the right reinforcing plate 40 (see FIGS. 3, 4 and 16) has a lower side edge 64 from which spaced apart, laterally offset front and rear bottom mounting lugs 66,68 downwardly project. In each of the mounting lugs 60,62,66,68 a circular hole 70 (see FIG. 6) extends therethrough between its front and rear side surfaces.

Each of the left and right front adapter blocks 42,44 (see FIGS. 3, 5 and 7) has a downturned mounting flange 72 at an outboard end thereof, and a clevis portion disposed at its inboard end and defined by two spaced apart, parallel vertical front and rear tabs 74 and 76 each having a vertical free end surface 78. A vertically spaced pair of upper and lower circular holes 80,82 are formed in each of the tabs 74,76 adjacent its end surface 78, and a circular hole 84 is formed in each tab 74,76 horizontally inwardly of its upper circular hole 80. On each of the left and right front adapter blocks 42 and 44, the holes 80,82,84 on each clevis tab 74,76 are respectively aligned with the holes 80,82,84 on the other clevis tab.

Each of the left and right rear adapter blocks 46,48 (see FIGS. 4, 5 and 8) has a downturned mounting flange 86 at an outboard end thereof, and a clevis portion disposed at its inboard end and defined by two spaced apart, parallel vertical front and rear tabs 88 and 90 each having a free end surface 92 that slopes downwardly and laterally outwardly. A spaced pair of upper and lower circular holes 94,96 are formed in each of the tabs 88,90 adjacent its sloping end surface 92, and a circular hole 98 is formed in each tab 88,90 inwardly of its upper circular hole 94. On each of the left and right rear adapter blocks 46 and 48, the holes 94,96,98 on each clevis tab 88,90 are respectively aligned with the holes 94,96,98 on the other clevis tab.

The front cross beam member 50 (see FIGS. 3, 9 and 13) has an elongated longitudinally intermediate portion 100 and laterally thickened opposite end portions 102 and 104 each having top and bottom circular holes 106,108 extending therethrough between front and rear sides thereof. The rear cross beam member 52 (see FIGS. 4, 10 and 14) has an elongated longitudinally intermediate portion 110 which is substantially thinner, in a vertical direction, that the intermediate portion 100 of the front cross beam member 50, and a pair of downwardly and longitudinally outwardly sloped opposite end portions 112 and 114. Through each of these sloped end portions 112,114 a pair of circular holes 116,118 extend between the front and rear side surfaces thereof.

Figure 11:
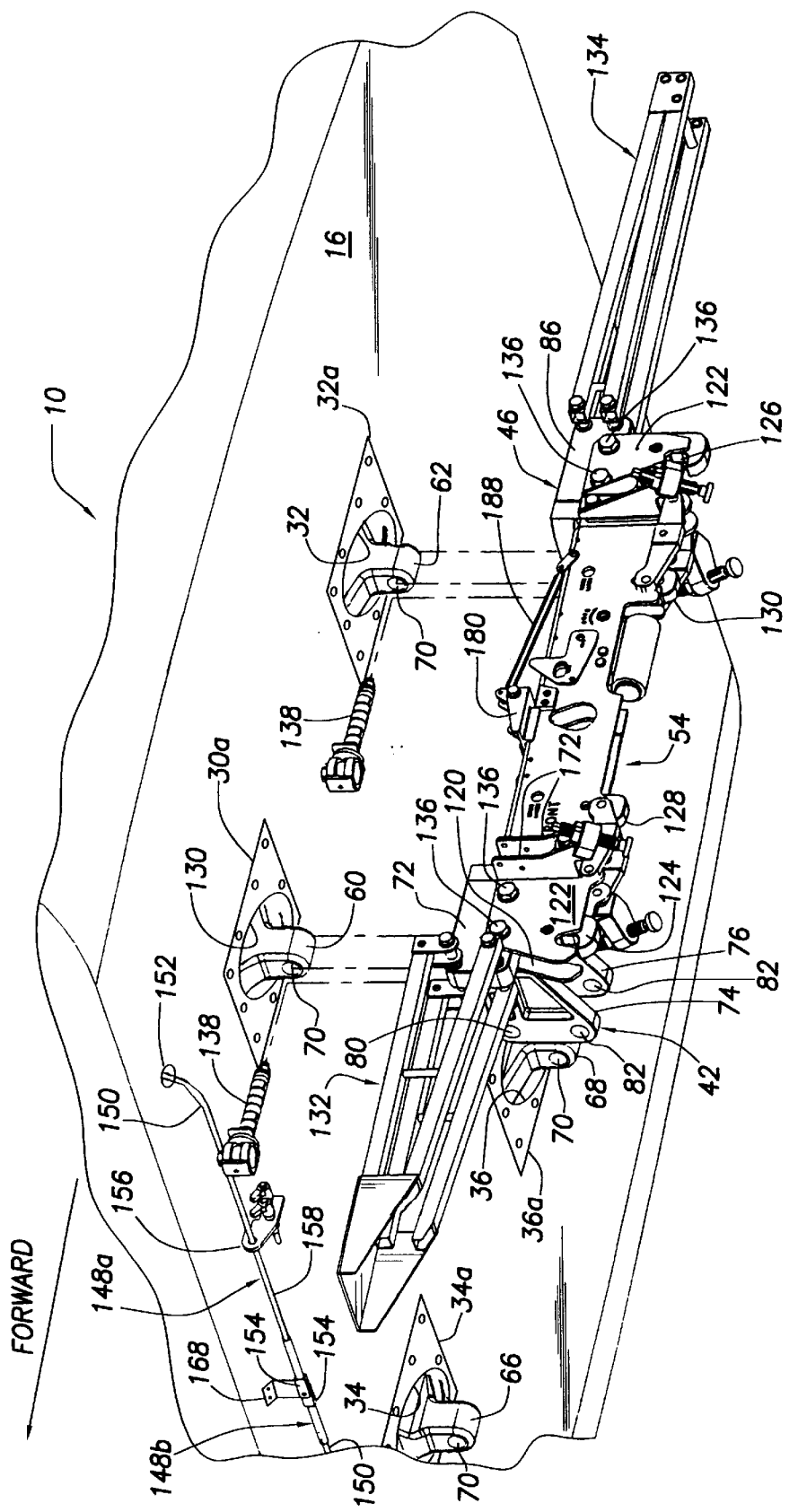
Figure 12:
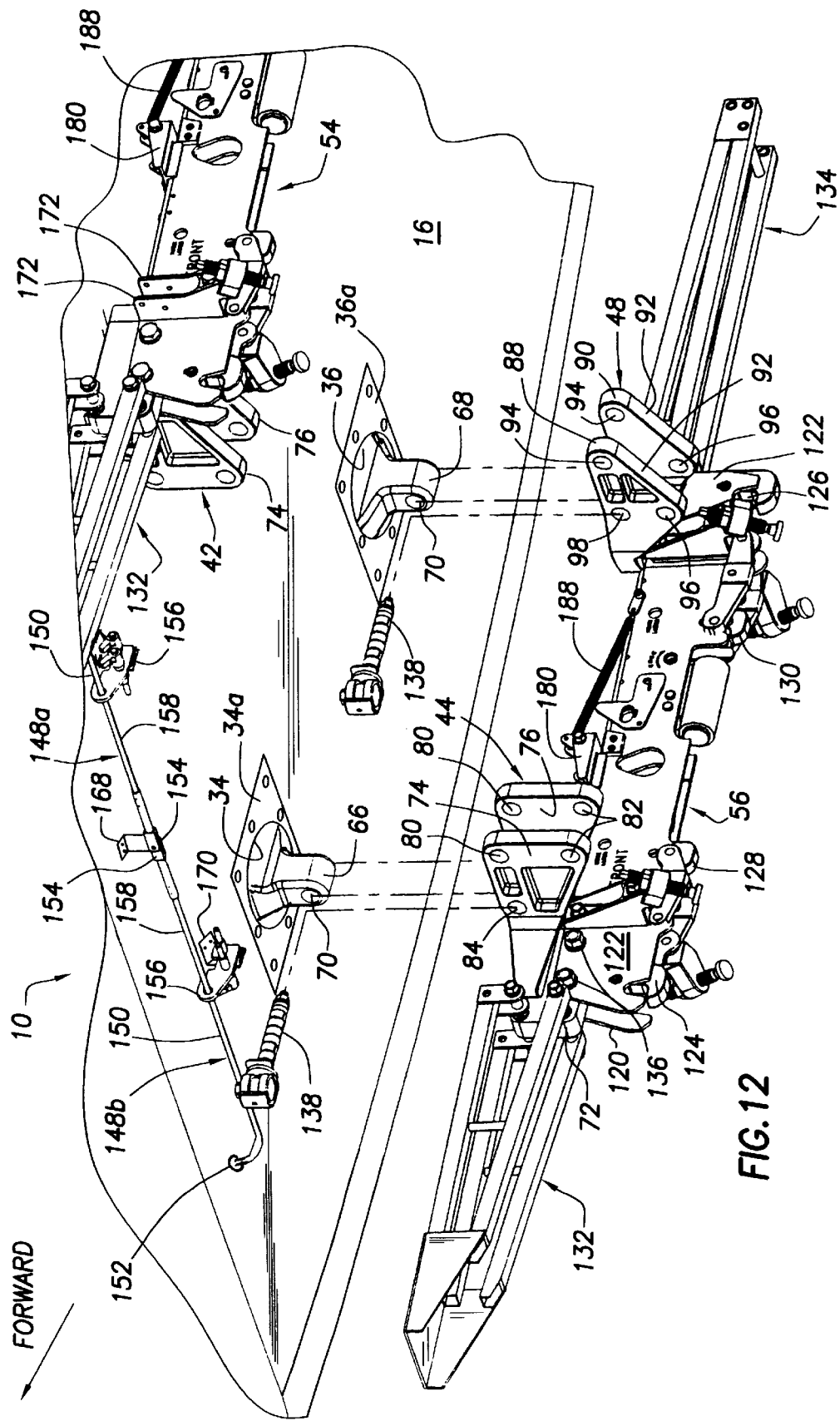

Each of the left and right bomb racks 54,56 (see FIGS. 2–5 and 11) is of a conventional construction and is representatively an external stores bomb rack having a "BRU-15" military designation. Each bomb rack 54,56 has, at its front and rear ends a spaced pair of parallel, vertical plates 120 and 122, and a bottom side edge portion having (1) on 30 inch centers, a pair of front and rear hook areas 124,126 operative in a conventional manner to releasably latch front and rear bomb lugs (not shown) on the missiles 22 to the undersides of the bomb racks 54 and 56, and (2) on 14 inch centers, a pair of front and rear hook areas 128,130 operative in a conventional manner to releasably latch front and rear bomb lugs on a pair of torpedoes (not shown) to the undersides of the bomb racks 54 and 56, to thereby mount the torpedoes in place of the missiles 22. As illustrated in FIGS. 11 and 12, each of the conventional bomb racks 54 and 56 has a missile umbilical mount structure 132 suitably secured to a front end portion thereof, and a missile fin deployment lanyard mount structure 134 suitably secured to a rear end portion thereof.

The installation of the armament apparatus 20 on the helicopter 10 will now be described with initial reference to FIGS. 3–5 and 11. As previously mentioned herein, the armament apparatus 20 is structurally tied to the keel beams 26 and 28 so that the armament apparatus weight is efficiently borne by the beams. To transfer the weight of the armament apparatus 20 to keel beams 26 and 28, the left and right reinforcing plates 38,40 are respectively anchored to the outboard sides of the left and right keel beams 26,28 in vertical orientations in which (1) the front and rear mounting lugs 60,62 of the left reinforcing plate 38 project downwardly through the helicopter underside openings 30,32 and downwardly beyond the bottom side wall 16 (see FIG. 11), and (2) the front and rear mounting lugs 66,68 of the right reinforcing plate 40 project downwardly through the helicopter underside openings 34,36 and downwardly beyond the bottom side wall 16.

The balance of the armament system 20 may then be installed using a representative assembly sequence illustrated in FIGS. 11–14. As will be appreciated by those of skill in this particular art, other assembly sequences could alternately be utilized if desired.

First, as illustrated in FIG. 11 (see also FIG. 5) the left bomb rack 54 is attached to the left front and rear adapter blocks 42,46 by (1) inserting the left front adapter block flange 72 downwardly between the end plates 120,122 at the front end of the left bomb rack 54, so that the clevis tabs 74,76 extend in an inboard direction from the bomb rack 54, and then securing the flange 72 between the end plates using fasteners 136, and (2) inserting the left rear adapter block flange 86 downwardly between the end plates 120,122 at the rear end of the left bomb rack 54, so that the clevis tabs 88,90 extend in an inboard direction from the bomb rack 54, and then securing the flange 86 between the end plates using fasteners 136.

The left bomb rack 54 is then moved upwardly toward the helicopter bottom side wall 16 until the clevis tab sets 74,76 and 88–90 respectively straddle the left front and rear mounting lugs 60,62 with the clevis tab holes 84 in the left front adapter block 42 being aligned with the hole 70 in the left front mounting lug 60, and the clevis tab holes 98 in the left rear adapter block 46 being aligned with the hole 70 in the left rear mounting lug 62. Expansion pins 138 are then inserted through the aligned holes 70,84 at the left front mounting lug 60, and through the aligned holes 70,98 at the left rear mounting lug 62, thereby rotatably securing the left front and rear adapter blocks 42,46 respectively to the left front and rear mounting lugs 60,62 and supporting the left bomb rack on such lugs.

Turning now to FIG. 12 (see also FIGS. 3 and 4), the right front and rear adapter blocks 44 and 48 are secured to the right bomb rack 56, and the right front and rear clevis tab sets 74,76 and 88,90 are rotatably secured to the right front and rear mounting lugs 66,68 using fasteners such as expandable pins 138, in the same manner as that just described for the left bomb rack 54. The left and right bomb racks 54,46 are shown supported in this manner on the underside of the helicopter in FIG. 13.

Figure 13:
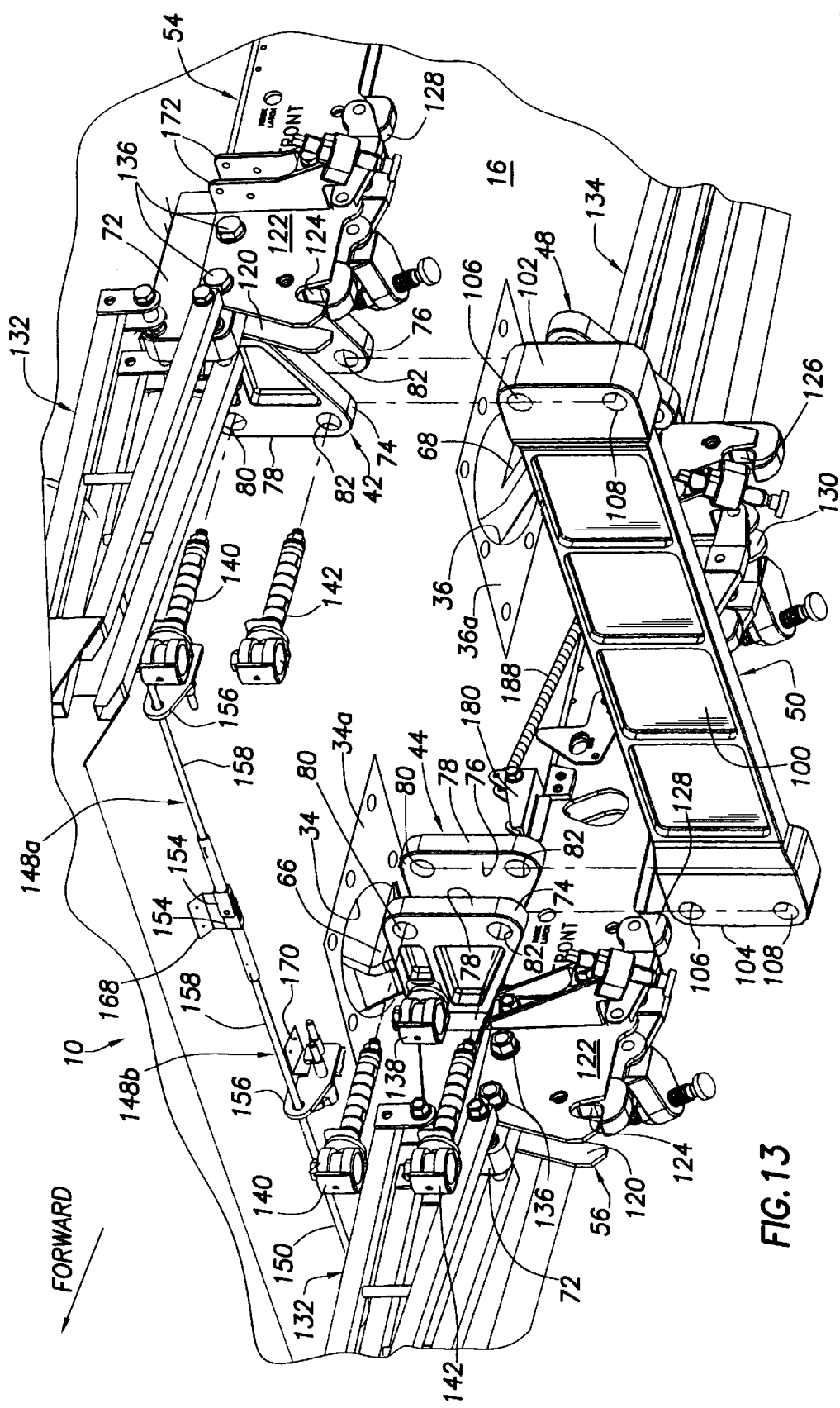

Next, as illustrated in FIG. 13, the front cross beam member 50 is installed by respectively moving its laterally enlarged left and right end portions 102,104 upwardly between the clevis tab sets 74,76 of the left and right front adapter blocks 42,44 until the holes 106,108 in the left cross beam end portion 102 are respectively aligned with the holes 80,82 in the left clevis tab set 74,76 and the holes 106,108 in the right cross beam end portion 104 are respectively aligned with the holes 80,82 in the right clevis tab set 74,76. Upper and lower expansion pins 140,142 are then respectively inserted through the aligned hole sets 80,106 and 82,108 to thereby nonpivotally anchor the left and right end portions 102,104 of the front cross beam member 50 to the left and right front adapter blocks 42,44 and structurally tie the left and right bomb racks 54 and 56, the left and right front adapter blocks 42 and 44, and the left and right front mounting lugs 60 and 66 together.

Figure 14:
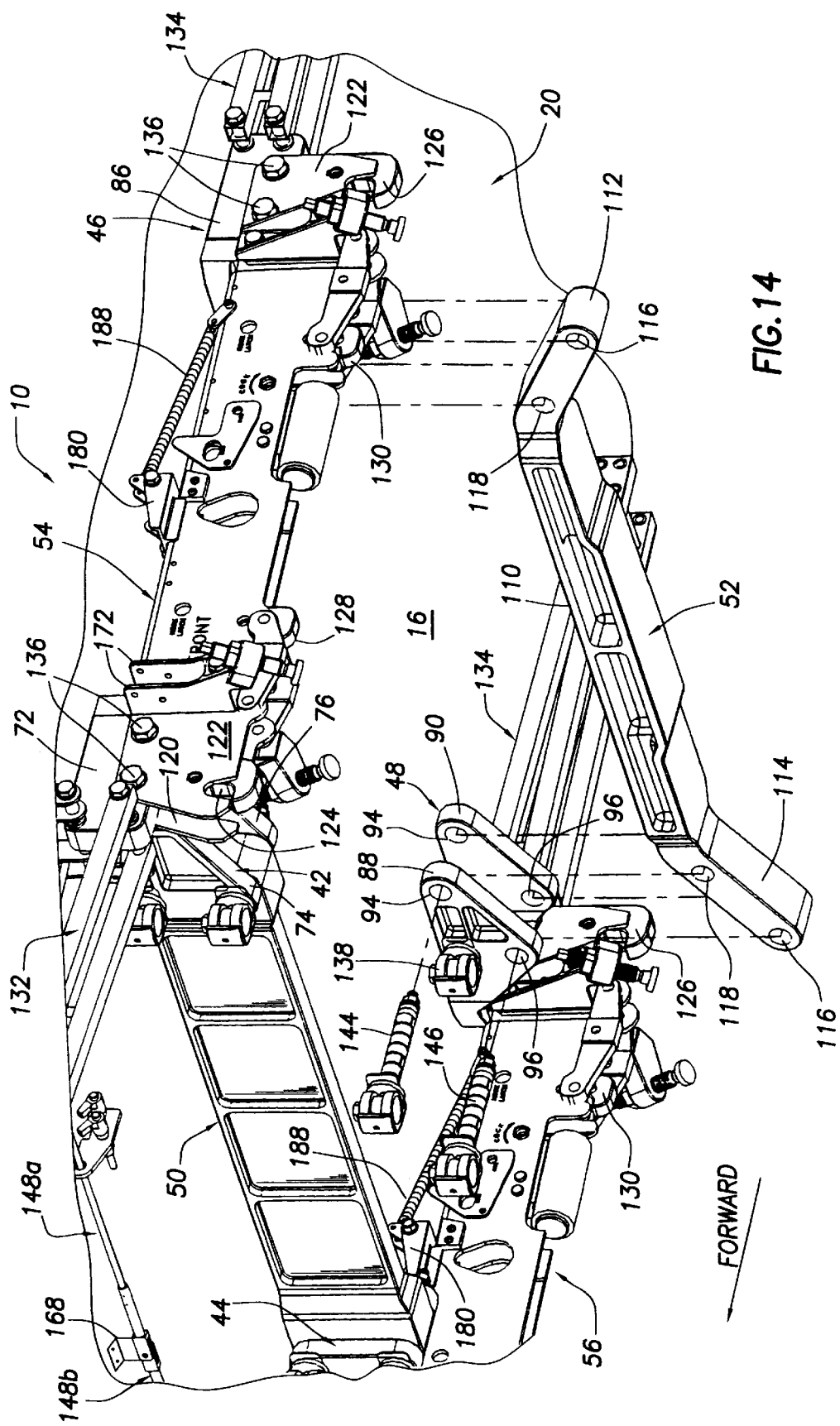
Figure 20:
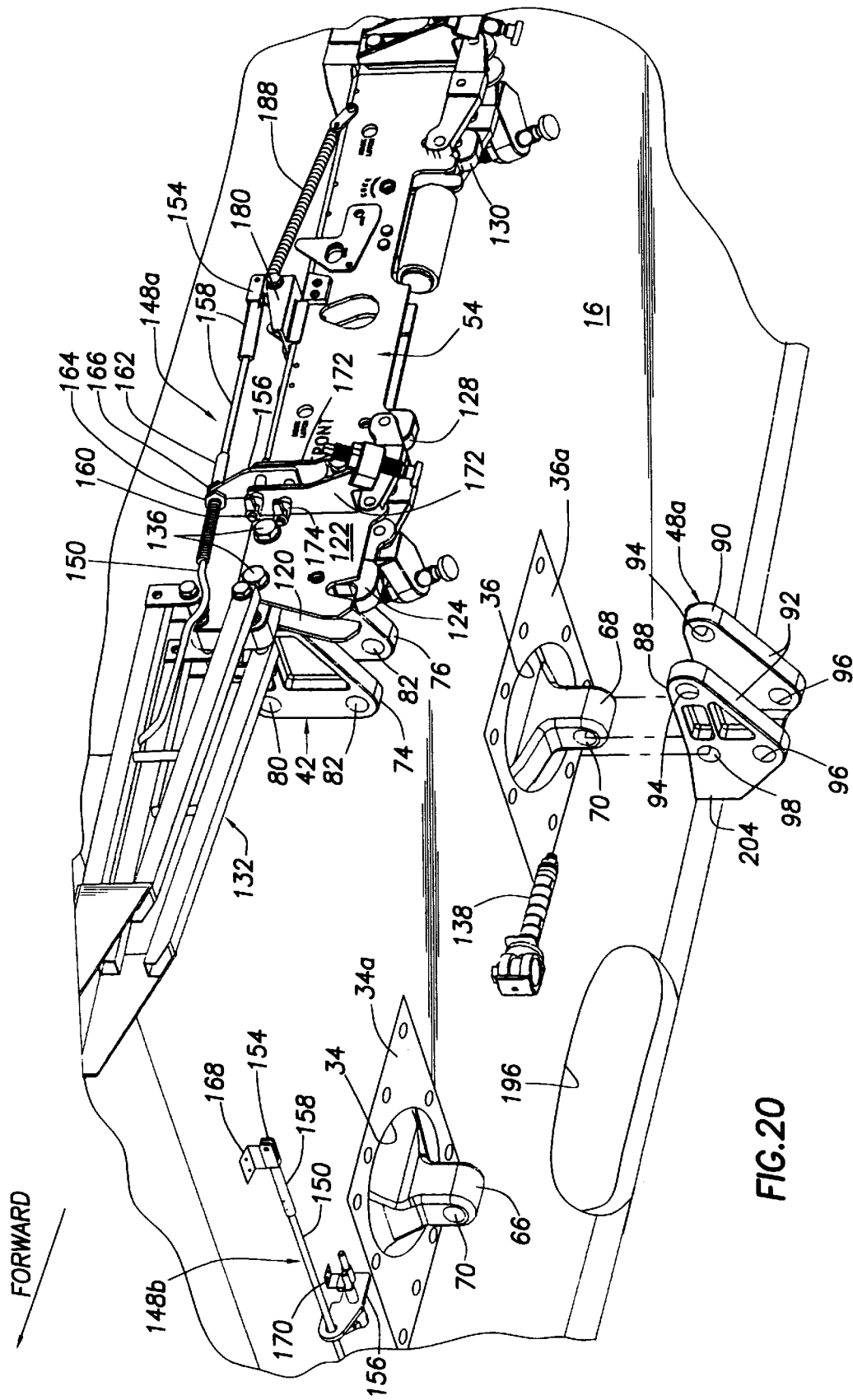
FIGS. 20–23 are front underside perspective views of the helicopter and sequentially illustrate the installation of portions of the alternate armament apparatus embodiment thereon.

Finally, as shown in FIG. 14, the rear cross beam member 52 is installed by upwardly moving its downwardly and outwardly sloping left and right end portions 112,114 to respectively between the clevis tabs 88,90 of the left and right rear adapter blocks 46,48 in a manner (1) bringing the holes 118,116 in the left cross beam end portion 112 into respective alignment with the holes 94,96 in the left rear clevis tab pair 88,90 (not visible in FIG. 14) and (2) bringing the holes 118,116 in the right cross beam end portion 114 into respective alignment with the holes 94,96 in the right rear clevis tab pair 88,90. Left and right sets of upper and lower expansion pins 144,146 (only the right set thereof being visible in FIG. 14) are then inserted through the aligned hole sets 94,118 and 96,116 at each of the rear clevis tab sets 88,90 to thereby nonpivotally anchor the left and right end portions 112,114 of the rear cross beam member 52 to the left and right rear adapter blocks 46,48 and structurally tie the left and right bomb racks 54 and 56, the left and right rear adapter blocks 46 and 48, and the left and right rear mounting lugs 62 and 68 together.

The left and right missiles 22 (see FIGS. 1 and 2) may then be operatively secured to the bottom sides of the bomb racks 54,56 using the previously described front and rear hook areas 124,126 thereon. As may be best seen in FIGS. 2 and 4, the mounted missiles 22 have folded rear upper and lower tail fin portions 22a that are operatively unfolded and deployed in a conventional manner in response to downwardly releasing the missiles 22 from their associated bomb racks 54,46. As may be best seen in FIG. 4, the specially designed configuration of the rear cross beam member 52, with its upwardly offset longitudinally intermediate portion 110, advantageously provides top side clearance for these folded tail fin portions 22a and permits the missiles 22 to be mounted on the underside of the helicopter 10 without creating ground clearance problems.

The installed missiles 22 are disposed in a vertically close relationship with the bottom side wall 16 of the helicopter 10 and are disposed inboard of the opposite sides 12,14 of the helicopter, on opposite sides of the helicopter centerline 19, with each missile being in relatively close lateral adjacency with the centerline 19. Accordingly, despite the relatively heavy weight of each missile, if either is dropped from the helicopter 10, the remaining missile's weight does not shift the helicopter's lateral center of gravity outside of design limits therefor as might be the case if the missiles were mounted outboard of the opposite sides 12,14 of the helicopter 10.

The pivotal securement of the helicopter underside portion of the armament apparatus 20 to the downwardly projecting mounting lugs 60,62,66,68 advantageously prevents appreciable torsional loads, centered about front-to-rear extending axes, from being transmitted to the front and rear reinforcing plates 38 and 40 via the adapter blocks and mounting lugs. At the same time, however, the opposite ends of each of the front and rear cross beam members 50,52 are rigidly connected to their associated front and rear mounting blocks as previously described herein.

With reference now to FIGS. 11–15, the left and right bomb racks 54,56 are respectively provided with manual release cable assemblies 148a,148b useable, in the event of electrical release failure, to permit the manual jettisoning of weapon stores mounted on the bomb racks 54,56. Each manual release cable assembly 148a,148b includes a length of flexible cable 150 extended upwardly through an associated underside opening 152 in the helicopter 10 to its cockpit area and having an outer end with a clevis fork 154 thereon, and a mounting flange portion 156 to the cable 150 inwardly of the clevis fork 154. As best illustrated in FIG. 15, each manual release cable assembly (the release cable assembly 148 being shown in FIG. 15) also has a rigid rod portion 158 secured to its clevis fork 154 and longitudinally extending inwardly therefrom.

Flexible cable 150 extends through an upper end opening in the mounting flange 156 and has a threaded cylindrical terminal fitting portion 160 positioned on the cable adjacent a ball joint sleeve 162 thereon. Terminal fitting 160 and ball joint sleeve 162 are anchored to the mounting flange 156, so as to project outwardly beyond opposite sides thereof, by a pair of lock nuts 164,166 threaded onto the terminal 160. This securement to the mounting flange 156 maintains it in a substantially fixed position along the length of the flexible cable 150. Terminal 160, ball joint sleeve 162, and lock nuts 164,166 are shown in FIG. 15, but have been omitted from FIGS. 11–14 for illustrative purposes.

The left and right manual release cable assemblies 148a, 148b are shown in FIGS. 11–14 in stowed orientations thereof prior to operative connection to the bomb racks 54,56. In such stowed orientations, the clevis forks 154 are interlocked and suitably pinned together, outer end portions of the flexible cables 150 extend exteriorly along the bottom side 16 of the helicopter 10, the interlocked clevis forks 154 are removably supported on the bottom side wall 16 by a bracket 168, and the mounting flanges 156 are removably supported on the bottom side wall 16 by brackets 170 (see FIGS. 13 and 21).

To operatively connect one of the manual release cable assemblies to its associated bomb rack (for example, to connect the left cable assembly 148a to the left bomb rack 54 as shown in FIG. 15), the clevis fork 154 and the mounting flange 156 of the assembly are disconnected from their helicopter underside support brackets 168 and 170, and the mounting flange 156 is placed between two spaced apart mounting tabs 172 disposed on the outboard side of the bomb rack 54 and releasably anchored therebetween using a pair of ball lock pins 174 inserted through aligned openings in the mounting flange 156 and the tabs 172.

Additionally, as also illustrated in FIG. 15, the clevis fork 154 is releasably pinned to an upper arm portion 176 of a bell crank structure 178 which is supported on the bomb rack 54 by a mounting assembly 180 for rotation about a horizontal axis 182 transverse to the front-to-rear length of the bomb rack 54. The bell crank structure 178 has a rearwardly projecting bottom arm 184 connected to a generally vertically extending stores jettisoning cable 186. Bell crank structure 178 is rotationally biased in a clockwise direction (as viewed in FIG. 15) by a coiled tension spring member 188 connected at one end to an upper end portion of the bell crank structure 178, and its other end to the bomb rack 54.

When the flexible cable 150 is pulled forwardly (from the helicopter cockpit) as indicated by the arrows 190 in FIG. 15, the bell crank bottom arm 184 is rotated in a counter-clockwise direction as indicated by the arrow 192, thereby pulling the jettisoning cable 186 upwardly, as indicated by the arrow 194, and jettisoning the associated missile 22 (or other weaponry operatively supported on the bomb rack 54). Of course, the other cable assembly 148b is connected to its associated bomb rack 56 in the same manner, and is operative in the same manner, as just described for the cable assembly 148a.

As just described, the armament apparatus 20 operatively positions two weapon support structures, such as the illustrated left and right bomb racks 54 and 56, on the underside of the helicopter 10 (or other type of aircraft) close to and on opposite sides of its longitudinal centerline 19 to thereby substantially reduce the potential lateral center of gravity shifting difficulties presented when attempts are made to support relatively heavy weapons (such as torpedoes or the illustrated missiles 22) outboard of the aircraft on opposite sides thereof.

An alternate embodiment 20a of the previously described armament apparatus 20 is illustrated in FIGS. 16–23. Armament apparatus 20a is configured to support only the left bomb rack 54 to thereby leave clearance (generally between the right front and rear mounting lugs 66,68) beneath a right underside portion of the helicopter 10 in which a dipping sonar transducer and cable opening 196 is positioned (see FIGS. 20 and 21). This single rack embodiment 20a of the armament apparatus is identical to the previously described dual rack embodiment with the exceptions that (1) the right bomb rack 56 is eliminated; (2) the right front adapter block 44 is eliminated; (3) a modified front cross beam member 50a is used in place of the previously described front cross beam member 50; and (4) a slightly modified right rear adapter block 48a is used in place of the previously described right rear adapter block 48.

The modified front cross beam member 50a (see FIGS. 16, 18 and 21) has a generally trapezoidally shaped longitudinally intermediate portion 100a which is vertically narrower at its left end that its right end, a laterally enlarged left end portion 102 (identical to the end portion 102 of front cross beam 50) with top and bottom holes 106,108 extending therethrough. The right end of the modified front cross beam member 50a has a clevis configuration defined by horizontally spaced, vertically oriented front and rear clevis tabs 198,200 with circular openings 202 therein. The modified right rear adapter block 48a (see FIGS. 17, 19, 20 and 22) is identical to the previously described right rear adapter block 48 with the exception that the downturned outboard bomb rack mounting flange portion is eliminated, leaving on the modified right rear adapter block 48a a foreshortened flat vertical outboard side portion 204.

The mounting of the modified, single rack armament apparatus 20a on the underside of the helicopter 10 is quite similar to the previously described mounting of the two rack armament apparatus 20 thereon. For example, with the left bomb rack 54 mounted to the left front and rear mounting lugs 60,62 as previously described (see FIG. 20), the modified right rear adapter block 48a is secured to the right rear mounting lug 68 using an expansion pin 138 extended through the aligned holes 70 and 98 in the mounting lug 68 and the clevis tabs 88,90 of the modified right rear adapter block 48a.

Figure 21:
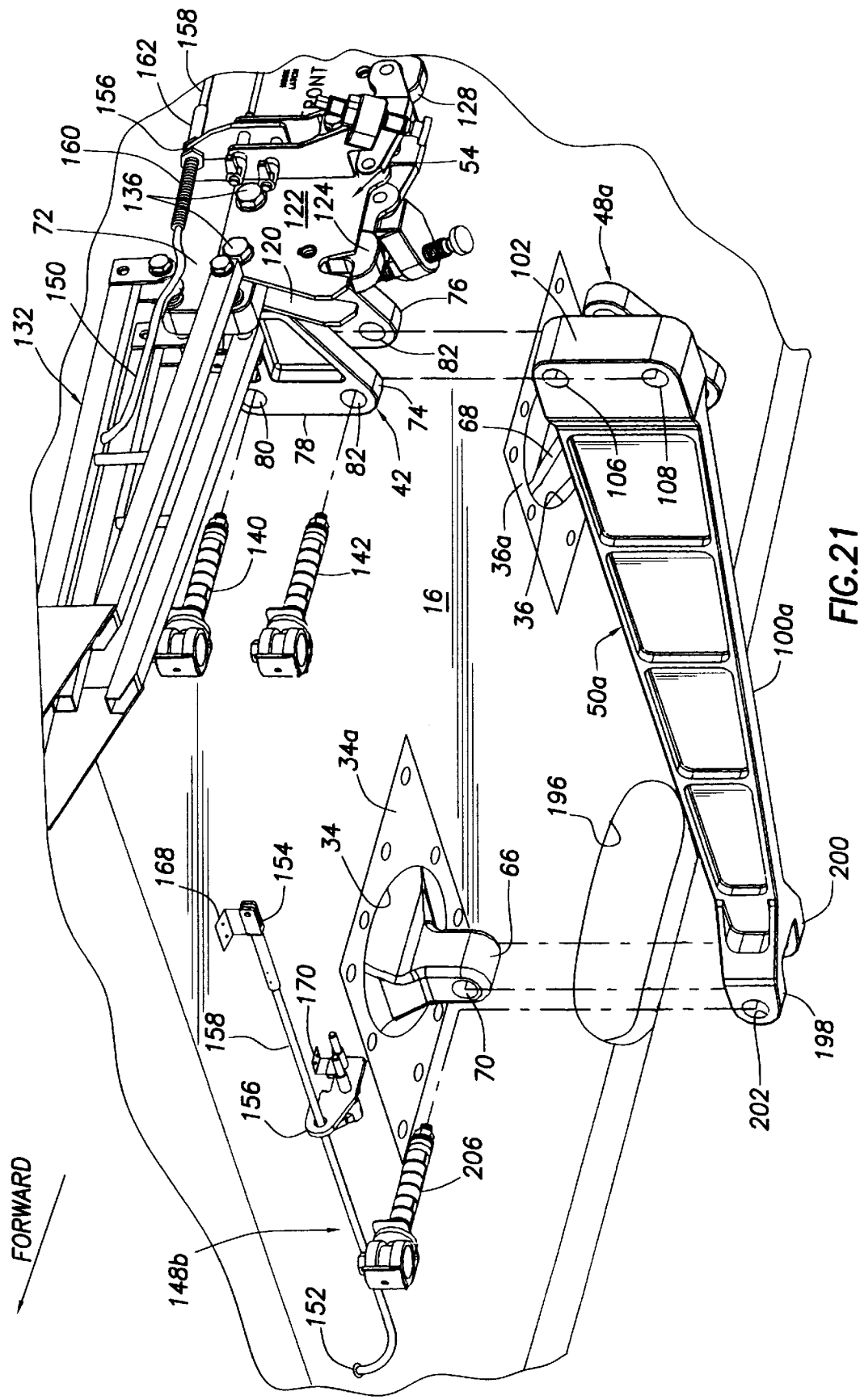

Next, as shown in FIG. 21, the right end portion 102 of the modified front cross beam member 50a is moved upwardly between the clevis tabs 74,76 of the left front adapter block 42, the left clevis end tabs 198,200 of the modified front cross beam member 50a are moved upwardly to straddle the left front mounting lug 66, the right end of the front cross beam member 50a is pinned in place using the upper and lower expansion pins 140,142 respectively extended through the aligned hole sets 80,106 and 82,108, and the left end of the front cross beam member 50a is pinned in place using an expansion pin 206 extended through the aligned hole set 70,202.

Figure 22:
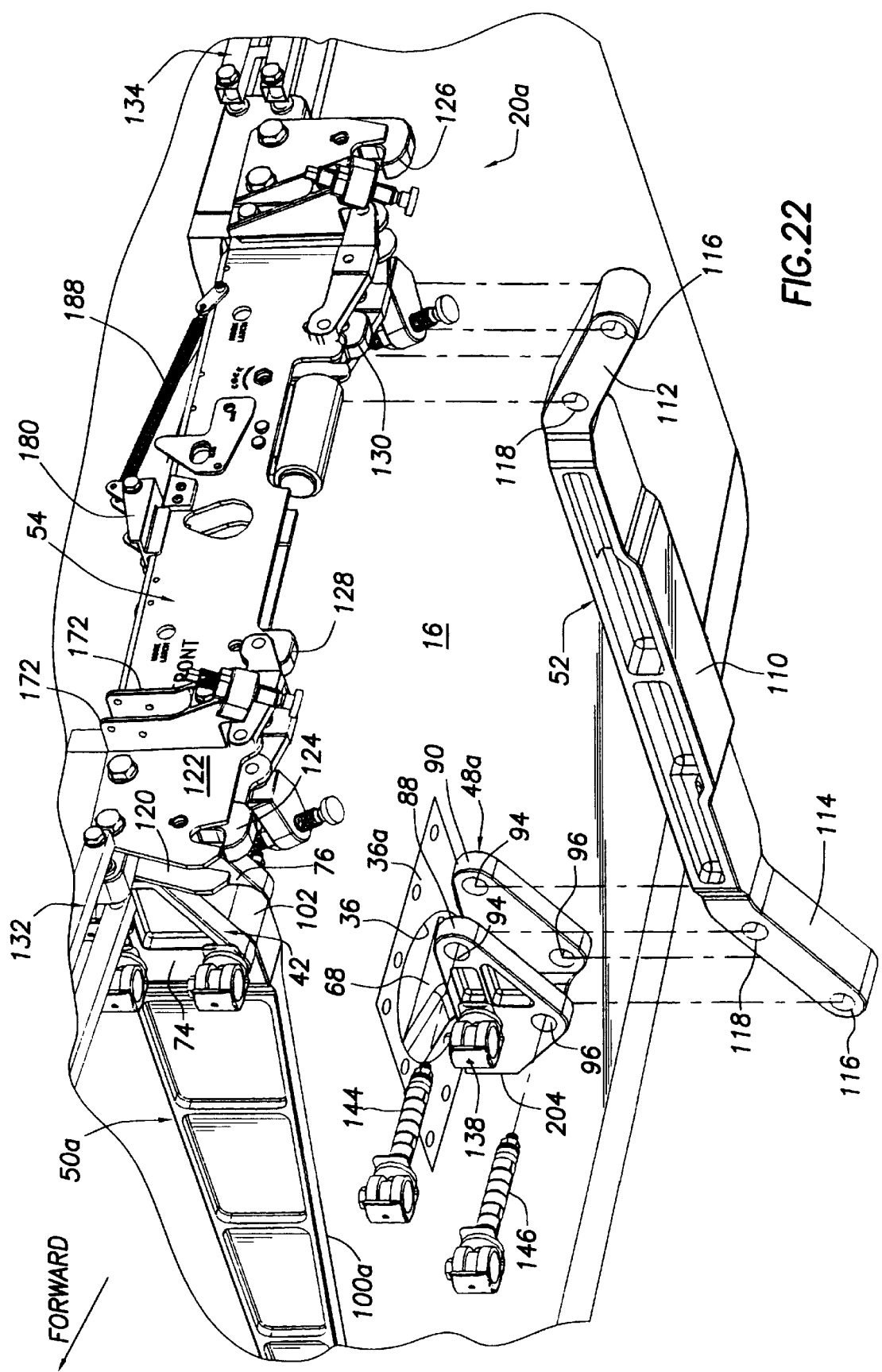
Figure 23:
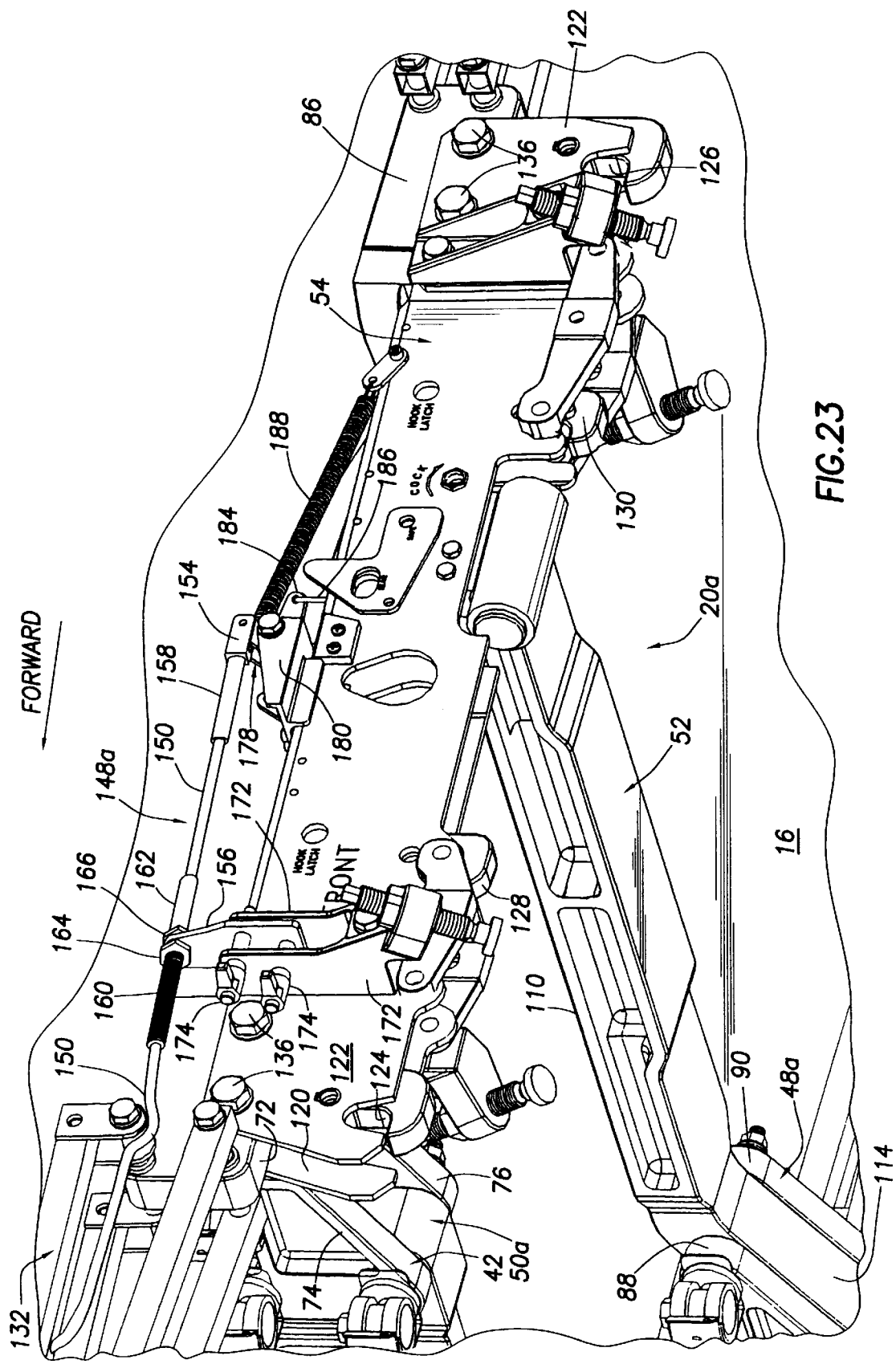

Then, as shown in FIG. 22, the rear cross beam member 52 is connected to the left and right rear adapter blocks 46 and 48a by moving the left and right outer end portions 112,114 of the rear cross beam member 52 upwardly their associated clevis tab pairs 88,90 of the left and rear adapter blocks 46,48a and then pinning the rear cross beam end portions 112,114 into place using two sets of the expansion pins 144,146 as previously described in conjunction with the two rack armament apparatus embodiment 20. Finally, the left manual release cable assembly 148a is operatively connected to the left bomb rack 54 (see FIG. 23) as also previously described in conjunction with the two rack armament apparatus embodiment 20.

The foregoing detailed description is to be clearly understood as being given by way of illustration and example, the spirit and scope of the present invention being limited solely by the appended claims.

What is claimed is:

1. Armament apparatus for use with an aircraft having a bottom exterior wall portion disposed beneath laterally spaced first and second interior structural members longitudinally extending parallel to and positioned on opposite sides of the front-to-rear centerline of the aircraft, said armament apparatus comprising:

first and second reinforcing structures attachable to the first and second interior structural members, respectively, each of said first and second reinforcing structures having front and rear bottom mounting lug portions configured and positioned to project downwardly beyond the bottom exterior wall portion through openings therein;

a front cross member having opposite end portions positionable adjacent said front bottom mounting lug portions of said first and second reinforcing structures;

a rear cross member having opposite end portions positionable adjacent said rear bottom mounting lug portions of said first and second reinforcing structures; and securement apparatus for (1) connecting said opposite end portions of said front and rear cross members, respectively, to said front and rear bottom mounting lug portions beneath the aircraft bottom exterior wall portion, and (2) supportingly securing front and rear end portions of a first weaponry support structure to said front and rear bottom mounting lug portions of said first reinforcing structure, the first weaponry support structure being operative to support a weapon thereon.

2. The armament apparatus of claim 1 wherein said securement apparatus is operative to permit pivotal movement between said securement apparatus and said front and rear bottom mounting lug portions about front-to-rear extending axes to thereby substantially prevent the imposition on said front and rear bottom mounting lug portions, via said securement apparatus, of torsional loads about said front-to-rear extending axes.

3. The armament apparatus of claim 2 wherein said securement apparatus includes first and second adapter structures having first portions pivotally securable to said front and rear bottom mounting lug portions of said first reinforcing structure, said first and second adapter structures further having second portions releasably connectable to the front and rear end portions of the first weaponry support structure, and third portions nonpivotally anchorable to said end portions of said front and rear cross members respectively positionable adjacent said front and rear bottom mounting lug portions of said first reinforcing structure.

4. The armament apparatus of claim 3 wherein said third portions of said first and second adapter structures have clevis sections adapted to straddle said front and rear bottom mounting lug portions of said first reinforcing structure and said end portions of said front and rear cross members respectively positionable adjacent said front and rear bottom mounting lug portions of said first reinforcing structure.

5. The armament apparatus of claim 4 wherein:

each of said front and rear bottom mounting lug portions of said first reinforcing structure has a first mounting member receiving hole therein, each of said end portions of said front and rear cross members respectively positionable adjacent said front and rear bottom mounting lug portions of said first reinforcing structure has a spaced pair of second and third mounting member receiving holes therein, and opposite sides of said clevis sections of said third portions of said first and second adapter structures have first mounting member receiving openings formed therein and outwardly alignable with said first mounting member receiving holes, and second and third mounting member receiving openings formed therein and outwardly alignable with said second and third mounting member receiving holes.

6. The armament apparatus of claim 1 wherein the aircraft is a helicopter, said first and second interior structural members are first and second keel beams, and said first and second reinforcing structures are reinforcing plates respectively securable to sides of said first and second keel beams.

7. The armament apparatus of claim 1 further comprising a first weaponry support structure operative to support a weapon thereon and having front and rear end portions.

8. The armament apparatus of claim 7 wherein said first weaponry support structure is a first bomb rack.

9. The armament apparatus of claim 8 wherein said first bomb rack has both a missile support portion and a torpedo support portion.

10. The armament apparatus of claim 8 wherein said first bomb rack is operative to releasably support a missile having folded upper tail fins, and said rear cross member is positioned and configured to provide clearance for the folded upper tail fins of the releasably supported missile.

11. The armament apparatus of claim 10 wherein said rear cross member has a generally straight longitudinally intermediate portion positionable above the folded upper tail fins of the releasably supported missile, with said opposite end portions of said rear cross member being downwardly and longitudinally outwardly sloped relative to said longitudinally intermediate portion of said rear cross member.

12. The armament apparatus of claim 7 wherein:

said armament apparatus further comprises a second weaponry support structure operative to support a weapon thereon and having front and rear end portions, and said securement apparatus is further operative to supportingly secure said front and rear end portions of said second weaponry support structure to said front and rear bottom mounting lug portions of said second reinforcing structure.

13. The armament apparatus of claim 12 wherein said securement apparatus includes third and fourth adapter structures having first portions pivotally securable to said front and rear bottom mounting lug portions of said second reinforcing structure, said third and fourth adapter structures further having second portions releasably connectable to said front and rear end portions of said second weaponry support structure, and third portions nonpivotally anchorable to said end portions of said front and rear cross members positionable adjacent said front and rear bottom mounting lug portions of said second reinforcing structure.

14. The armament apparatus of claim 13 wherein said third portions of said third and fourth adapter structures have clevis sections adapted to straddle said front and rear bottom mounting lug portions of said second reinforcing structure and said end portions of said front and rear cross members positionable adjacent said front and rear bottom mounting lug portions of said second reinforcing structure.

15. The armament apparatus of claim 14 wherein:

said front and rear bottom mounting lug portions of said second reinforcing structure have first mounting member receiving holes therein, said end portions of said front and rear cross members positionable adjacent said front and rear bottom mounting lug portions of said second reinforcing member have spaced pairs of second and third mounting member receiving holes therein, and opposite sides of said clevis sections of said third portions of said third and fourth adapter structures have first mounting member receiving openings formed therein and outwardly alignable with said first mounting member receiving holes in said front and rear bottom mounting lug portions of said second reinforcing structure, and second and third mounting member receiving openings formed therein and outwardly alignable with said second and third mounting member receiving holes in said end portions of said front and rear cross members positionable adjacent said front and rear bottom mounting lug portions of said second reinforcing structure.

16. The armament apparatus of claim 12 wherein said second weaponry support structure is a second bomb rack.

17. The armament apparatus of claim 16 wherein said second bomb rack has both a missile support portion and a torpedo support portion.

18. A method of supporting armament on an aircraft having a bottom exterior wall portion disposed beneath laterally spaced first and second interior structural members longitudinally extending parallel to and positioned on opposite sides of the front-to-rear centerline of the aircraft, said method comprising the steps of:
  forming spaced apart front and rear openings in said bottom exterior wall portion generally beneath each of said first and second interior structural members;
  providing first and second reinforcing structures each having front and rear lug portions along lower edge portions thereof;
  securing said first and second reinforcing structures, respectively, to said first and second interior structural members with said front and rear lug portions of said first and second reinforcing structures aligned with and extending downwardly through the front and rear openings to beneath said bottom exterior wall portion;
  connecting opposite ends of a front cross member to said front lug portions;
  connecting opposite ends of a rear cross member to said rear lug portions; and
  supportingly associating with the front and rear lug portions of said first reinforcing structure opposite ends of a first weaponry support structure to which a weapon may be releasably secured.

19. The method of claim 18 wherein said supportingly associating step is performed using a bomb rack adapted to removably support either a missile or a torpedo.

20. The method of claim 18 further comprising the step of removably mounting a weapon on said first weaponry support structure.

21. The method of claim 20 wherein said removably mounting step is performed by removably mounting a missile on said first weaponry support structure.

22. The method of claim 21 wherein the mounted missile has folded tail fins disposed beneath said rear cross member, and said method further comprises the step of configuring said rear cross member to provide clearance thereunder for said folded tail fins.

23. The method of claim 18 wherein said connecting steps include the steps of forming pivotal connections with said front and rear lug portions of said first and second reinforcing structures in a manner substantially preventing the imposition of torsional loads on said first and second reinforcing structures, about front-to-rear extending axes, through said front and rear lug portions of said first and second reinforcing structures.

24. The method of claim 18 further comprising the step of supportingly associating with the front and rear lug portions of said second reinforcing structure opposite ends of a second weaponry support structure to which a weapon may be releasably secured.

25. The method of claim 24 wherein said step of supportingly associating with the front and rear lug portions of said second reinforcing structure opposite ends of a second weaponry support structure to which a weapon may be releasably secured is performed using a bomb rack adapted to removably support either a missile or a torpedo.

26. The method of claim 24 further comprising the step of removably mounting a weapon on said second weaponry support structure.

27. The method of claim 18 wherein:
  said first and second interior structural members are first and second beams,
  said providing step is performed by providing first and second reinforcing plate structures, and
  said securing step is performed by vertically securing said reinforcing plate structures, respectively, to sides of said first and second beams.

* * * * *